UNITED STATES PATENT OFFICE 2,806,303
IMPLEMENT ROCK DIGGER ATTACHMENT

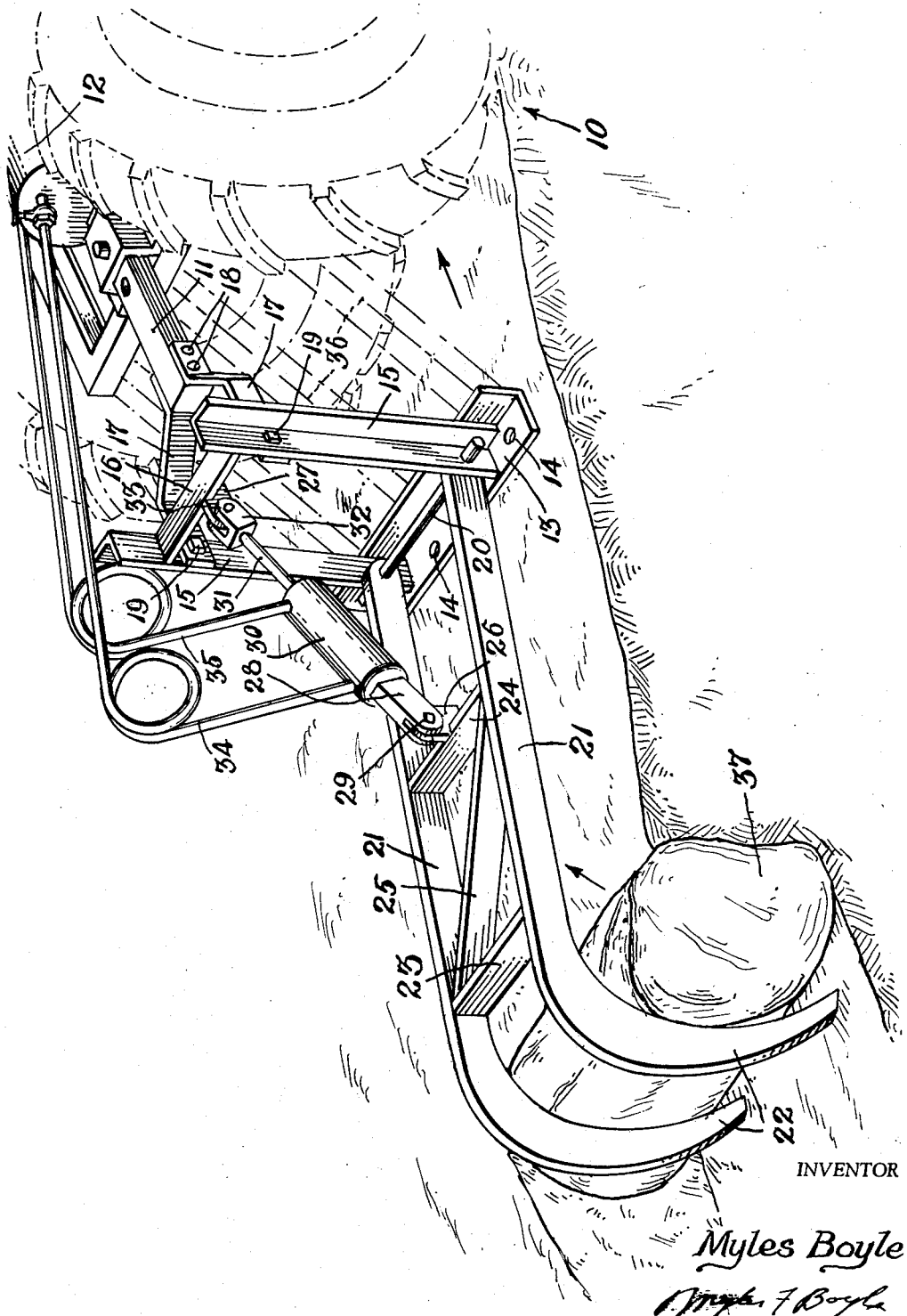

Myles F. Boyle, Buchanan, N. Dak.

Application October 23, 1956, Serial No. 617,718

5 Claims. (Cl. 37—2)

This invention relates to rock digging attachments to be used in conjunction with tractors having a hydraulic pump for operating and engaging various implements and tools and which, when manipulated by the operator, will dig rocks out of the ground.

Heretofore, it has been more or less common practice for farmers and road contractors to dig rocks manually, for example by lifting the rocks out of the ground by the employment of crowbar.

It is accordingly a principal object of the present invention to provide an attachment which, when used in conjunction with the tractor, will dig rocks out of the ground by a combination of pulling and lifting action.

It is another object of the present invention to provide an inexpensive attachment of the above type which can be manufactured in small shops with a few common, standard small shop tools and which can be readily attached to a tractor in a matter of minutes.

It is still another object of the present invention to provide an attachment of the above type which can be used in conjunction with tractors having standard hydraulic pumps and implement cylinders.

For other objects and for a better understanding of the invention, reference may be had to the following detailed description taken in connection with the accompanying drawing, in which the figure of the drawing is a perspective view of a preferred embodiment of the present invention shown in operative use.

Referring now more in detail to the drawing, 10 indicates generally a conventional tractor having the usual draw bar 11 and hydraulic pump or implement cylinder 12, substantially as illustrated.

In the practice of my invention, a rock digging attachment is provided for the tractor 10 and includes the angle bar 13 having the mounting openings 14. A pair of laterally spaced angle bar uprights 15 are secured at their lower ends to the angle bar 13, being connected at their upper ends by the cross bar 16.

A pair of Z-shaped bars 17 are connected to the draw bar 11 at one end by means of the nut and bolt assemblies 18 and at their other ends to the inner faces of the uprights 15 by means of the nut and bolt assemblies 19.

The lower ends of the uprights 15 mount a transverse shaft 20, the latter serving to rotatably mount the forward ends of the beams 21 formed at their rear ends with the hook shaped portions 22. The beams 21 are connected by the longitudinally spaced transverse braces 23 and 24 and the diagonal brace 25.

A plate 26 is fixedly connected to the top central portion of the transverse brace 24 at right angles thereto while a second plate 27 is fixedly connected to the cross bar 16 at right angles thereto, the plate 27 extending downwardly and rearwardly of the cross bar in the manner shown.

The bifurcated member 28 is pivotally connected to the plate 26 by means of the pin 29, the other end of the member 28 being fixedly connected to the lower end of the hydraulic cylinder 30. A piston, not shown, is slidably mounted within the hydraulic cylinder 30 and fixedly carries the piston rod 31 which extends through the other end of the cylinder. A bifurcated member, or yoke-shaped member 32 is fixedly connected to the outer end of the piston rod 31 and is pivotally connected to the plate 27 by means of the pin 33.

A hydraulic line 34 is connected to the lower end of the cylinder 31 at one end and to the hydraulic pump or implement cylinder 12 at the other end. A second hydraulic line 35 is similarly connected to the other end of the cylinder 30 at one end and to the hydraulic pump or implement cylinder 12 at the other end whereby to actuate the piston in opposite directions, as will be obvious.

Braces 36 are provided for connecting the angle bar 13 to the tractor 10.

In operation, the hooked ends 22 of the beams are raised and lowered by the double acting or push-pull cylinder 30 by feeding oil alternately to opposite sides of the piston by means of the lines 34 and 35 from the pump 12. The tractor operator either drives over the rock 37 or backs over it, thereby dropping and forcing the hook ends 22 into the ground behind the rock by means of the cylinder 30, after which the tractor 10 is put in forward gear to bring the tractor forward and at the same time raising force is applied on the cylinder 30, to remove the rock 37 from the ground by a combination of pulling and raising or rolling action.

The rock digging attachment may also be fastened by other suitable means to the tractor. For example, the cross angle bar 13 may be connected directly to the draw bar 11 by means of the mounting openings 14. In this case the bar 17 would be replaced by straight bars connected at their rear ends to the uprights 15 by means of the nut and bolt assemblies 19 and at their forward ends to the tractor frame, as will be obvious.

While various changes may be made in the detail construction, it shall be understood that such changes shall be within the spirit and scope of the present invention as defined by the appended claims.

What I claim as new and desire to protect by Letters Patent of the United States is:

1. An implement rock digger attachment for tractors comprising a transverse base member, a pair of laterally spaced uprights secured at their lower ends to said transverse base member, a transverse upper member secured at opposite ends to the upper ends of said uprights, means for securing said transverse base member and uprights to the rear of the tractor, a pair of laterally spaced beams pivotally connected at their forward ends to said uprights near their lower ends, brace means connecting said beams together, the rear ends of said beams being formed with hook-shaped depending portions adapted to engage a rock upon dropping said beams downwardly, a hydraulic cylinder, means pivotally connecting one end of said hydraulic cylinder to said transverse brace means, a piston and piston rod in operative engagement with said hydraulic cylinder, means pivotally connecting the outer end of said piston rod to said upper transverse member, a pair of reversible hydraulic fluid lines connected at one end to the opposite ends of said hydraulic cylinder and hydraulic reversible pump means carried by the tractor, the other ends of said hydraulic lines being connected to said pump means whereby to raise and lower said look shaped portions for engagement with the rock and to permit the rock to be removed by an upward movement of said hook shaped members in conjunction with the forward movement of the tractor to effect a double action or push-pull movement whereby to roll the rock out of the ground.

2. An implement rock digger attachment according to claim 1, said transverse brace means including at least two longitudinally spaced transverse braces and a diagonal brace intermediate said transverse braces, said means for pivotally mounting said cylinder on said transverse brace means comprising an upwardly and forwardly extending plate secured to the forwardmost of said transverse braces at the center thereof, a bifurcated member secured at one end to said cylinder, and a pin pivotally connecting the bifurcated portion of said bifurcated member to said plate.

3. An implement rock digger attachment according to claim 2, said means pivotally connecting said piston rod to said upper transverse member comprising a downwardly and rearwardly extending plate secured to said transverse brace member, a bifurcated member secured to the end of said piston rod, and a pin pivotally connecting said second bifurcated member to said second plate.

4. An implement rock digger attachment according to claim 3, said means for securing said lower base member and uprights to the tractor comprising a pair of Z-shaped brackets secured at their rear ends to the upper ends of said uprights and at their forward ends to the opposite sides of the draw bar of the tractor, and brace means connecting said lower base member with the tractor frame.

5. An implement rock digger attachment according to claim 3, said means for connecting said lower transverse base member and said uprights with the tractor comprising said lower base member having mounting openings, and fastening means securing said lower base member to the draw bar of the tractor, and a pair of straps, the rear ends of said straps being secured to the upper ends of said uprights, the forward ends of said straps being secured to the frame of the tractor.

References Cited in the file of this patent

UNITED STATES PATENTS 2,629,305   Schenwolf _____ Feb. 24, 1953

FOREIGN PATENTS 483,528   Canada _____ May 27, 1952